(12) United States Patent
Koopmann et al.

(10) Patent No.: US 6,209,711 B1
(45) Date of Patent: Apr. 3, 2001

(54) CONVEYING DEVICE FOR OPEN-CAST MINES

(75) Inventors: Klaus Koopmann, Erlangen; Dieter Weber, Forchheim; Christian Keller, Eckental-Eckenhaid; Werner Daus, Lauta; Siegfried Körber, Jämlitz, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/403,642
(22) PCT Filed: Apr. 21, 1998
(86) PCT No.: PCT/DE98/01105
  § 371 Date: Jan. 10, 2000
  § 102(e) Date: Jan. 10, 2000
(87) PCT Pub. No.: WO98/47793
  PCT Pub. Date: Oct. 29, 1998

(30) Foreign Application Priority Data
Apr. 22, 1997 (DE) .............................. 197 16 908

(51) Int. Cl.⁷ .................................... B65G 43/00
(52) U.S. Cl. ...................................... 198/502.2; 198/502.4
(58) Field of Search .............................. 198/502.1, 502.2, 198/502.4, 832.1

(56) References Cited

U.S. PATENT DOCUMENTS

| 3,236,358 | * | 2/1966 | Gieskieng | 198/502.2 X |
| 4,010,857 | * | 3/1977 | Reim et al. | 198/502.2 X |
| 4,088,222 | * | 5/1978 | Hurt | 198/502.4 |

FOREIGN PATENT DOCUMENTS

| 30 15 978 | 11/1981 | (DE) . |
| 42 40 094 | 6/1994 | (DE) . |
| 295 14 592 | 12/1995 | (DE) . |
| 297 07 246 | 8/1997 | (DE) . |
| 2 518 072 | 6/1983 | (FR) . |

* cited by examiner

Primary Examiner—James R. Bidwell
(74) Attorney, Agent, or Firm—Kenyon & Kenyon

(57) ABSTRACT

A conveyor for opencast installations, is described, the conveyor includes at least one conveyor belt driven by at least one drive, or a device resembling a conveyor belt. Overburden or raw materials such as coal, for example, is extracted by an extracting unit and transported further by the conveyor belt.

11 Claims, 2 Drawing Sheets

FIG 2

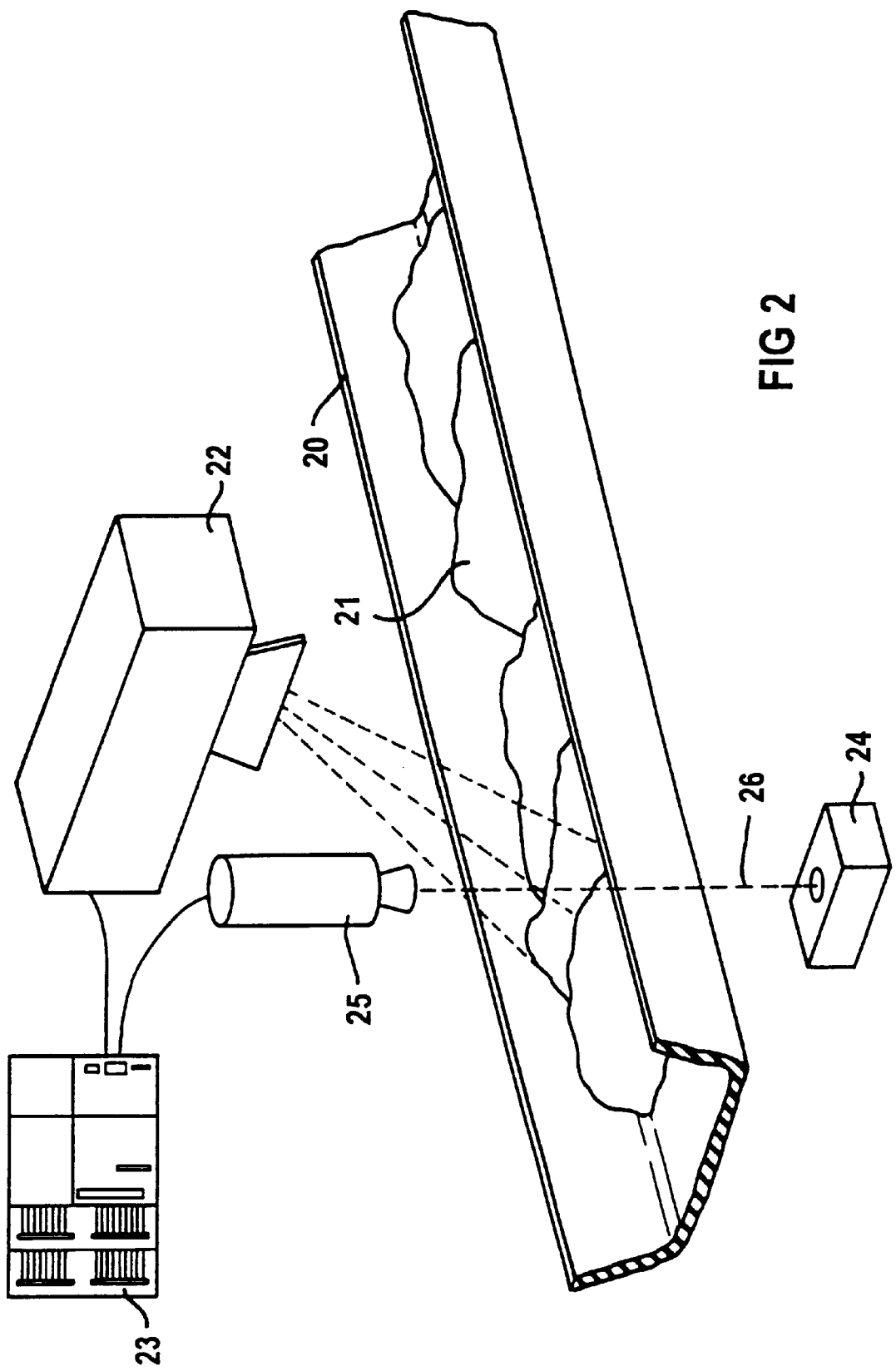

CONVEYING DEVICE FOR OPEN-CAST MINES

FIELD OF THE INVENTION

The present invention relates to a conveyor for opencast installations, having at least one conveyor belt driven by at least one drive, or a device resembling a conveyor belt, overburden or raw materials such as coal, for example, being extracted by means of an extracting unit and transported further by means of the conveyor belt.

BACKGROUND INFORMATION

In opencast installations, raw materials such as coal, for example, are frequently transported many kilometres on conveyor belts or devices resembling conveyor belts. A great deal of electric energy is consumed in this transporation.

SUMMARY

It is therefore an object of the present invention to promote a conveyor for opencast installations in which the energy consumption can be substantially lowered by comparison with known conveyors for opencast installations as described in, for example, German Patent No. 42 40 094. In addition, it is particularly desirable to reduce the maintenance outlay for conveyors.

According to the present invention, a conveyor is provided in which the torque/time curve of the conveyor device is monitored so that:

rapid changes in torque are detected;

the changes in the torque are detected for purposes of detecting sliding slippage (unloading of the device) or as blockage.

Whereas conventional conveyors for opencast installations are run continuously at one speed, which essentially corresponds to a speed required for maximum conveying power, according to the present invention, the speed is matched to the slippage, particularly in the case of starting up, as a result of which the demand for electric energy is also reduced.

When sliding slippage is identified according to the present invention, the driven torque may be adapted, in the short term, for example, by superimposed regulation of the available power transmission (friction angle, Eytelwein equation). In this way, slippage in the belt drives may be prevented to a great extent. Additionally, the drives may transmit the available torque (friction angle, satisfaction of the Eytelwein equation) in a force-closed fashion under all operating conditions (e.g., dynamic changes in belt tension, starting up slippage, snow, rain, wear and, thus, different drum diameters on the same system). The torques of the individual drives for the multiple drive system of a belt installation may be corrected, leading to a better utilization of the drives and to a reduction in wear.

In one example embodiment of the present invention, the controller or the regulator sets the speed of the conveyor belt in such a way that the conveyor belt is fully utilized. This operating point corresponds to a maximum energy savings. Since the running power is reduced in conjunction with the same rate of conveyance, an increase in service life is provided, and the maintenance outlay is reduced.

In a further example embodiment of the invention, the conveyor system has a monitoring device which is designed to monitor the conveyor belt, in particular with temporal foresight, for overload and to prevent overloading of the conveyor belt. In this way, overloading of the conveyor belt is avoided by the increase in speed according to the present invention. The monitoring with foresight, which renders it possible for the conveyor belt to be accelerated in good time despite its high inertia, allows the system to react to peak loads with reference to the overburden to be transported or to the raw materials.

In an example embodiment of the present invention, the speed of the conveyor belt is determined by the maximum value of the overburden or raw material to be transported in a specific time interval. Large control movements in the drives and possible overloading due to the inertia of the conveyor belt are prevented in this way. In this case, the time interval is advantageously longer than the time for running the conveyor belt up to maximum speed.

In a further example embodiment of the present invention, the conveyor has at least one measuring device by means of which the quantity of the overburden to be transported or of the raw materials to be transported is measured. The measurement may be carried out so early that discontinuities with respect to the quantity of overburden or raw materials to be transported are detected in such good time that the conveyor belt can be accelerated to a speed which corresponds to the new load state.

In order to prevent costly damage to the conveyor, controllers or regulator and/or the measuring device may be designed to be at least doubly redundant, the values they supply being compared with one another. If, given two-fold redundancy, said values deviate from one another, the conveyor belt is accelerated to its maximum speed. Given multiple redundancy, the faulty component can be identified and eliminated.

In a further example embodiment of the present invention, the conveyor has variable-speed drives, in particular variable-speed three-phase AC motors.

The energy saved by the conveyor according to the present invention is yielded as follows: Saving of energy loss W per startup in rotor resistances, liquid or eddy-current couplings of conventional drives in the case of runup with the slipage control:

$$W = \frac{0.5 \, P_N f t_A}{3600} \tag{1}$$

Here, $P_N$ is the nominal power of the motors in kW, f being the starting load factor, that is to say the mean starting torque, and $t_A$ being the runup time in seconds. The equivalent power loss $P_{vz}$ during the operating time $T_B$ is calculated as follows:

$$P_{VZ} = \frac{Z_a W}{T_B} \tag{2}$$

Here, $Z_a$ is the number of startups per year. According to equations (1) and (2), $$\frac{P_{VZ}}{P_N} = \frac{0.5 \, f Z_a t_A}{3600 \, T_B} \tag{3}$$

for the power loss referred to the nominal power $P_N$.

Taking account of the required power $P_B$ and of the load factor, it holds for the saving on power loss $P_{VD}$ caused by the repeated slippage $S_D$ without motor slippage that:

$$\frac{P_{VD}}{P_N} = \eta_L k S_D \tag{4}$$

In this case, $h_L$ is the load factor, i.e., the mean conveying power $Q_M$ referred to the nominal conveying power $Q_N$, and k is the required power $P_N$, in the case of nominal conveying power referred to the nominal power $P_N$, that is to say $K=P_B/P_N$. The result is a saving in friction power and churning power by matching the belt speed V to the conveyance discharge Q in accordance with the following calculations:

The friction power and churning power at a constant belt speed $V_N$, i.e., for $V=V_N=$const., is:

$$\frac{Q}{Q_N} = \frac{m}{m_N} \tag{5}$$

Here, Q is the conveyance discharge, m the mass of the material to be conveyed on the conveyor belt and $M_N$ the mass of the material to be conveyed on the conveyor belt in the case of nominal loading. It holds in general for the friction power that $P_R=F_R$ V. Using equation (5), it holds for $V=V_N=$const. that:

$$\frac{P_R}{P_{RN}} = \frac{F_R}{F_{RN}} = f\left(\frac{Q}{Q_N}\right) \tag{6}$$

Here, $P_{RN}$ is the friction power or churning power in the case of nominal conveying power, $F_R$ is the friction force and churning force, and $F_{RN}$ is the nominal friction force and churning force. The function can be described in an approximate fashion in accordance with (6) by the following formula:

$$\frac{P_R}{P_{RN}} = \lambda_V + (1-\lambda_V)\frac{Q}{Q_N} \tag{7}$$

a value for $l_v$ of between 0.3 and 0.6, in particular a value of $l_v=0.53$ having proved through measurements to be particularly suitable.

It holds for the friction power and churning power in the case of const. loading $m_N$ for $m=m_N=$const. that:

$$\frac{Q}{Q_N} = \frac{V}{V_N} \tag{8}$$

it holding with $P_R=F_R$ V that:

$$\frac{P_R}{P_{RN}} = \frac{F_R}{F_{RN}}\frac{V}{V_N} \tag{9}$$

The function $F_R=f(v)$ can be represented to a first approximation by the following formula. With equation (8) it holds that:

$$\frac{F_R}{F_{RN}} = \lambda_m + (1-\lambda_m)\frac{Q}{Q_N} \tag{10}$$

a value of around $l_m=0.79$ having proved through measurement to be particularly suitable.

According to equations (9) and (10), it holds for the friction power and churning power that:

$$\frac{P_R}{P_{RN}} = \lambda_m\frac{Q}{Q_N} + (1-\lambda_m)\left(\frac{Q}{Q_N}\right)^2 \tag{11}$$

The saving $DP_R$ on friction power and churning power as a function of the conveying power is yielded from the difference between equations (7) and (11).

$$\frac{\Delta P_R}{P_{RN}} = \lambda_V + (1-\lambda_V-\lambda_m)\frac{Q}{Q_N} - (1-\lambda_m)\left(\frac{Q}{Q_N}\right)^2 \tag{12}$$

the saved friction power and churning power referred to the nominal power of the motors is yielded [lacuna]

$$\frac{\Delta P_R}{P_N} = f\left(\frac{Q}{Q_N}\right) \tag{13}$$

The following equation holds for the required power $P_B$ of the drive motors:

$$P_B=P_{HN}+P_{RN}=K\ P_N \tag{14}$$

Here, $P_{HN}$ is the nominal lifting power in the case of nominal conveying power $Q_N$, that is to say $P_{HN}=g\cdot H\cdot Q_N$, g being the acceleration of free fall and H the height of lift.

According to $P_{RN}$ equation (14) yields:

$$P_{RN} = KP_N\left(1 - \frac{P_{HN}}{KP_N}\right) \tag{15}$$

When substituted in equation (12), equation (15) yields:

$$\frac{\Delta P_R}{P_N} = K\left(1 - \frac{P_{HN}}{KP_N}\right)\left[\lambda_V + (1-\lambda_V-\lambda_m)\frac{Q}{Q_N} - (1-\lambda_m)\left(\frac{Q}{Q_N}\right)^2\right] \tag{16}$$

The saved power is yielded from the arithmetic mean value of equation (16) during the operating time $t_B$.

$$\frac{\Delta P_{Rm}}{P_N} = \frac{1}{T_B}\int_0^{T_B}\frac{\Delta P_R(t)}{P_N}dt \tag{17}$$

To a first approximation, the mean value $DP_{RM}$ can be determined by substituting the mean conveying power $Q_m=h_L\ Q_N$ in equation (16). It therefore holds for the saved energy that:

$$\frac{\Delta P_{Rm}}{P_N} \approx K\left(1 - \frac{P_{HN}}{KP_N}\right)[\lambda_V + (1-\lambda_V-\lambda_m)\eta_\lambda - (1-\lambda_m)\eta_L^2] \tag{18}$$

Accordingly, an energy saving of up to 17% is yielded for an average rate of conveyance $h_L=0.75$.

BRIEF DESCRIPTION OF THE DRAWINGS

FIG. 2 shows the principle of the mode of operation of a belt weigher operating in a contactless fashion.

DETAILED DESCRIPTION

Figure 1:
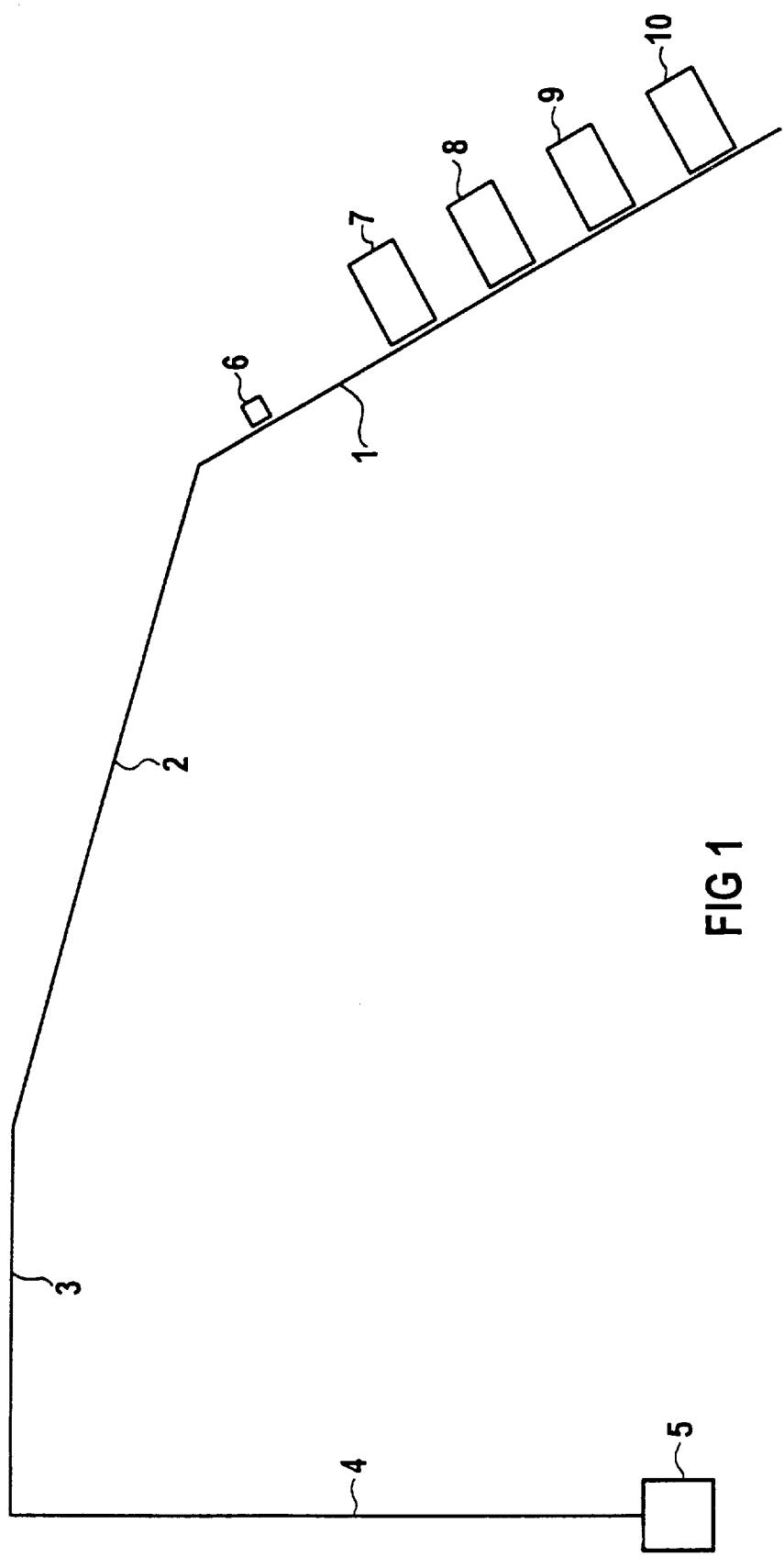
FIG. 1 shows an exemplary embodiment for the use of a conveyor according to the present invention.

FIG. 1 shows an exemplary embodiment for the use of a conveyor according to the present invention. In this case, raw materials, in particular coal, are extracted by extracting units 7, 8, 9, 10, for example excavators, and passed to a conveyor belt 1. The raw materials are transported to a loading device 5 by means of the conveyor belt 1 and further conveyor belts 2, 3, 4. In the exemplary design, the conveyor belt 1 is operated at a speed which is required to remove the raw materials when the extracting units 7, 8, 9, 10 are operating at maximum output. The conveying power is determined by means of a measuring device, which is designed, in particular, in a redundant fashion. The conveyor belts 2, 3 and 4 then have their speeds matched to the mass flow in conjunction with an appropriate time delay. For example, if the conveying unit 7 is initially not in operation and is then taken into operation during operation of the extracting units 8, 9, 10, the result on the conveyor belt 1 is an increase in the conveying power, that is to say the filled height in the conveyor belt 1 rises given a constant speed of the conveyor belt. This rise is detected in the measuring device 6, and the conveyor belts 2, 3 and 4 are accelerated. The measuring device 6 can be, for example, a belt weigher, or a belt weigher operating in a contactless fashion in accordance with FIG. 2.

FIG. 2 shows the principle of the mode of operation of a belt weigher, operating in a contactless fashion, for measuring the mass flow or the conveyed mass of a bulk material 21, i.e., raw materials or overburden, on a conveyor belt 20. The belt weigher according to the present invention has a filled height measuring device 22 and a density measuring device. The density measuring device has a radiation source 24 and a radiation receiver 25. The radiation 26 emitted by the radiation source 24 and received by the radiation receiver 25 penetrates the conveyor belt 20 and bulk material 21. For evaluation purposes, the filled height measuring device 22 and the density measuring device are connected to an evaluation unit 23. However, evaluation can also be performed in the density measuring device or in the filled height measuring device 22. The data connection between the density measuring device, filled height measuring device and evaluation unit 23 can be performed via a bus system or point-to-point connections.

What is claimed is:

1. A conveyor for opencast installations, comprising:
    at least one extracting unit extracting one of overburden and raw materials;
    a conveyor belt transporting the one of the overburden and the raw materials;
    a drive driving the conveyor belt, a time derivative of a torque of the drive being monitored for exceeding a predetermined tolerance value; and
    a controller setting a speed of the conveyor belt as a function of a quantity of the one of the overburden and the raw materials to be transported.

2. The conveyor according to claim 1, wherein the one of the overburden and the raw material is coal.

3. The conveyor according to claim 1, wherein the controller sets the speed of the conveyor belt so that the conveyor belt is fully utilized.

4. The conveyor according to claim 1, further comprising:
    a monitor monitoring the conveyor belt, the monitor predictively monitoring the conveyor belt for overload.

5. The conveyor according to claim 4, wherein a time interval for predicting overload is longer than a time for running the conveyor belt up to maximum speed.

6. The conveyor according to claim 1, further comprising:
    at least one measuring device measuring the quantity of the overburden and the raw materials to be transported.

7. The conveyor according to claim 6, wherein the at least one measuring device determines the quantity of the one of the overburden and the raw materials to be transported before the one of the overburden and the raw materials reaches the conveyor belt.

8. The conveyor according to claim 4, wherein the monitor is at least doubly redundant.

9. The conveyor according to claim 6, wherein the at least one measuring device is at least doubly redundant.

10. The conveyor according to claim 1, wherein a slippage between the conveyor belt and the drive is determined as a function of a time derivative of the torque of the drive.

11. The conveyor according to claim 10, further comprising:
    a slippage controller correcting the slippage between the conveyor belt and the drive as a function of time derivative.

* * * * *